United States Patent [19]

Huisman

[11] Patent Number: 4,934,736
[45] Date of Patent: Jun. 19, 1990

[54] KNEE RESTRAINING DEVICE

[76] Inventor: Marinus Huisman, Reiherweg 5, 3174 Meine, Fed. Rep. of Germany

[21] Appl. No.: 317,625

[22] Filed: Mar. 1, 1989

[30] Foreign Application Priority Data

Mar. 4, 1988 [DE] Fed. Rep. of Germany ....... 3807023

[51] Int. Cl.5 .......................................... B60R 21/045
[52] U.S. Cl. ..................................... 280/752; 180/90; 296/70
[58] Field of Search ............... 280/751, 752, 748, 753; 296/37.12, 70; 180/90

[56] References Cited

U.S. PATENT DOCUMENTS

| 3,947,056 | 3/1976 | Schwanz | 280/730 |
| 4,273,359 | 6/1981 | Scholz et al. | 280/751 |
| 4,434,999 | 3/1984 | Sato | 280/752 |
| 4,518,172 | 5/1985 | Bortz et al. | 280/751 |
| 4,723,792 | 2/1988 | Sakamoto et al. | 280/751 |

Primary Examiner—Richard A. Bertsch
Attorney, Agent, or Firm—Brumbaugh, Graves, Donohue & Raymond

[57] ABSTRACT

In the particular embodiment described in the specification, a knee-restraining device for vehicles, such as passenger cars, has a hollow-profile support assembly that extends across the entire width of the vehicle under the dashboard. The support assembly consists of two hollow-profile support member joined by interconnecting ends and is attached to the car body at the sides of the vehicle, and a deformation element supported on each hollow-profile support member is flexible and energy-absorbent. To facilitate the simplest possible assembly of such a knee-restraining device in a vehicle that has, for example, a center panel, the hollow-profile support members have cross-sections of such dimensions that the adjacent ends of the support members can be fitted into each other to create a locking connection which can be subsequently disconnected.

4 Claims, 1 Drawing Sheet

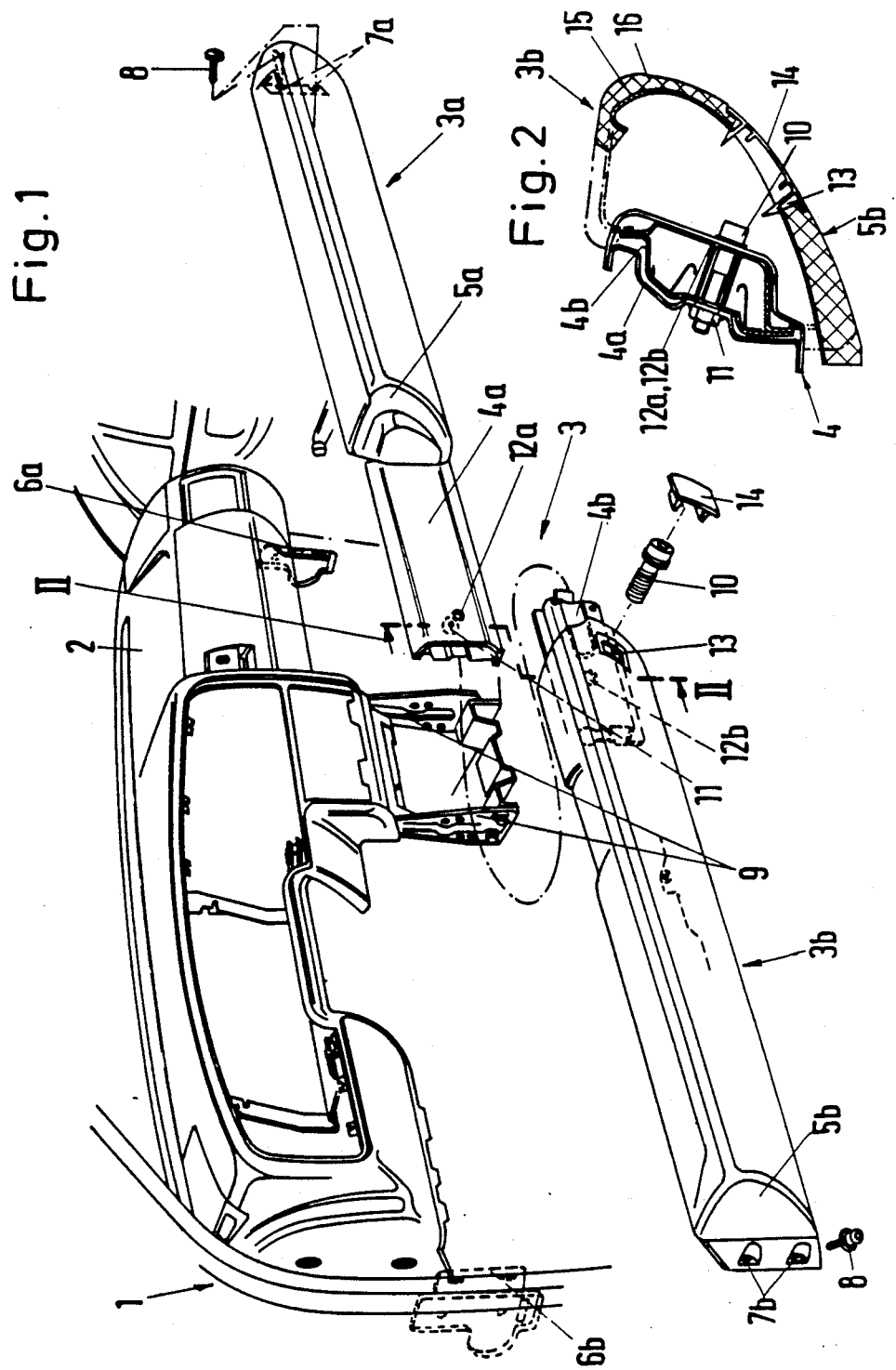

KNEE RESTRAINING DEVICE

BACKGROUND OF THE INVENTION

This invention relates to knee-restraining devices for vehicles such as passenger cars in which a deformable member is mounted on a rigid support member which extends across the width of the vehicle beneath the dashboard.

Knee-restraining devices of this type are known, for example, from U.S. Pat. No. 3,947,056. Such knee-restraining devices usually extend continuously from the mounting positioned at one side wall, for example, on an A-post of the vehicle, to a corresponding mounting positioned on the opposite side wall of the vehicle, at approximately the height of the passengers' knees. Usually, electrical wiring and components and similar equipment are mounted behind the knee-restraining device, i.e., forwardly thereof in the direction of motion of the vehicle. To permit access to such components, it is often necessary for the entire knee-restraining device to be removed. This is particularly disadvantageous when the vehicle includes a center panel designed to hold miscellaneous components such as radios and the like and the restraining device is installed behind the center panel. In such cases, the panel with its components must be completely disassembled before the knee-restraining device can be removed. An even more difficult situation is presented when the restraining device is installed behind a mounting that supports the center of the dashboard.

SUMMARY OF THE INVENTION

Accordingly, it is an object of the present invention to provide a new and improved knee-restraining device which overcomes the above-mentioned disadvantages of the prior art.

Another object of the invention is to provide a knee-restraining device which facilitates access to the components installed behind the restraining device even if still other components, such as a center panel or similar element, are installed in front of the knee-restraining device.

These and other objects of the invention are attained by providing a knee-restraining device consisting of two segments, each extending for approximately half the total length of the device, in which the segments are connected by interengaging support members. In this way, the assembly and disassembly of the knee-restraining device as well as other components mounted behind it are made considerably easier.

BRIEF DESCRIPTION OF THE DRAWINGS

Further objects and advantages of the invention will be apparent from a reading of the following description in conjunction with the accompanying drawings, in which:

FIG. 1 is a fragmentary perspective view illustrating the forward portion of the interior of a vehicle in which a representative embodiment of a knee-restraining device arranged according to the invention is shown in an exploded view; and FIG. 2 is a cross-sectional view of the device illustrated in FIG. 1, taken on the line II—II and looking in the direction of the arrows.

DESCRIPTION OF PREFERRED EMBODIMENT

In the fragmentary view shown in FIG. 1, the front portion 1 of a passenger car includes a dashboard 2 and a kneerestraining device 3 installed beneath the dashboard 2. In accordance with the invention, the knee-restraining device 3 consists of two segments 3a and 3b, each of which includes an inflexible hollow-profile support member 4a or 4b, respectively, and a deformation element 5a or 5b, respectively, mounted on the corresponding hollow-profile support member. The hollow-profile support members 4a and 4b have cross-sectional configurations designed so that they are interengaging at one end by making the end of the member 4a slidable into the end of the member 4b, as depicted in FIG. 2.

At their outer ends, the segments 3a and 3b have two attachment holes 7a and 7b so that two attachment screws 8 can be used to anchor each end of the knee-restraining device 3 to corresponding supporting plates 6a and 6b installed at the sides of the vehicle in the region of the A-posts. After the adjacent ends of the hollow-profile support members 4a and 4b have been interconnected, the support members are rigidly joined by a connecting bolt 10 that passes through corresponding openings 12a and 12b in the members and is screwed into a nut 11 welded on the back of the hollow-profile support segment 4a, which has a larger cross-section.

As best seen in the cross-sectional view of FIG. 2, each flexible deformation element, which absorbs energy upon impact by the knees, consists of a sheet-metal shell 15, which rests on the corresponding hollow-profile support member and has thin walls curving forward, and which is covered with a layer of foam 16 for comfort. In the region adjacent to the junction of the two hollow-profile support members 4a and 4b, the connection between the sheet-metal shell 15 and the hollow-profile support member 4b is eliminated, permitting the support member 4a to slide between the member 4b and the shell 15 of the member 4a. In addition, a gap may be left between the adjacent ends of the deformation elements 5a and 5b at the center of the vehicle, since it can be assumed that there will be no impact by the knees of a passenger at this point in the vehicle.

An opening 13 is provided in the deformation element 5b for the purpose of screwing the connecting bolt 10 into the joined hollow-profile support members 4a and 4b, and the opening can be covered by a cap 14 that is coordinated in color and surface structure with the comfort foam layer.

The assembly of the knee-restraining device 3 in the vehicle according to the invention is accomplished in the following manner. First, the segment 3a is installed in the right side of the vehicle and is attached by means of fastening screws 8 to the supporting plate 6a which is anchored in the area of the A-post, the hollow-profile support member 4a which projects beyond the deformation element 5a at the left end of segment 3a being positioned behind the support feet 9 of the dashboard 2. If desired, a support element can also be provided on one of the support feet 9 to hold the end of the hollow-profile support member 4a, which projects slightly past the center point of the vehicle.

Final assembly of any components under the dashboard on the left side of the vehicle, such as, for example, a central electronics system or other wiring work, is then carried out. In addition, a central panel, not shown in the drawing, may be attached to the support feet 9 at this stage. Thereafter, the knee-restraining device member 3b, shown on the left in FIG. 1, is installed by inserting the projecting end of the support member 4b, which extends beyond the deformation element 5b, into the open end of the hollow-profile support member 4a of the other segment 3a, anchoring the outer end of the member 3b to the supporting plate 6b by the fastening screws 8. Finally, after alignment of the restraining device 3 as a whole, a rigid connection between the two hollow-profile support segments 4a and 4b is effected by inserting the connecting bolt 10 through the connection holes 12a and 12b of the hollow-profile support members and tightening it into the weld nut 11.

If it is necessary thereafter to carry out work on vehicle components which are behind the knee-restraining device, for example, the electrical wiring or the central electronics system, the work can be done without disassembling the entire restraining device. Because of the improved design according to the invention, it is only necessary to remove the connecting bolt 10, loosen the fastening screws 8 on the supporting plate 6b, and remove the segment 3b on the left side of the vehicle by separating the interconnecting ends of the hollow-profile support members 4a and 4b.

Because of the segmented structure, each of the knee-cushion half-sections can be installed and removed with the vehicle doors installed. Furthermore, the two knee-cushion sections can be installed in laterally reversed arrangement, if necessary.

Notwithstanding this significant simplification of the assembly process for the knee-restraining device achieved by the invention, the simplification does not affect the operation and function of the knee-restraining device, especially its effectiveness as a restraining device for the knees of the vehicle occupants sitting in the front seats of the vehicle. Because the hollow-profile support segments are interconnecting and are rigidly joined, for example by means of a connecting bolt, the result is the provision of a support for two deformation elements allocated for the two vehicle seats individually, which is in no way inferior as regards its flexing strength to a one-piece continuous support. For this purpose, it is important that the interconnecting parts of the two hollow-profile support segments 4a and 4b be sufficiently long and fit without excessive play.

Although the invention has been described herein with reference to a specific embodiment, many modifications and variations of the invention will readily occur to those skilled in the art. Accordingly, all such variations and modifications are included within the intended scope of the invention.

I claim:

1. A knee-restraining device for vehicles comprising rigid hollow-profile support means extending across the width of the vehicle, attachment means for anchoring the support means at the sides of the vehicle, and deformable impact-absorbing means supported on the hollow-profile support means, wherein the hollow-profile support means comprises two interengaging support members having ends which can be fitted slidably into one another to form a rigid connection.

2. A knee-restraining device according to claim 1 wherein each member is allocated to one front seat of the vehicle and has an associated deformable impact-absorbing member.

3. A knee-restraining device according to claim 1 or 2 wherein the ends of the two members comprising the hollow-profile support means may be disassembled after they have been fitted together to form a rigid connection.

4. A knee-restraining device according to any of claims 1 to 3 including mounting means for mounting a center panel in front of the hollow-profile support means.

* * * * *

UNITED STATES PATENT AND TRADEMARK OFFICE
CERTIFICATE OF CORRECTION

PATENT NO. : 4,934,736
DATED : June 19, 1990
INVENTOR(S) : Marinus Huisman

It is certified that error appears in the above-identified patent and that said Letters Patent is hereby corrected as shown below:

ON TITLE PAGE: following Item [76] insert:

--[73] Assignee: Volkswagen AG, Wolfsburg, Federal Republic of Germany--;

6th line of ABSTRACT, "member" should read --members--;

Column 2, line 5, "kneerestraining" should read --knee-restraining--.

Signed and Sealed this

Twelfth Day of May, 1992

Attest:

DOUGLAS B. COMER

*Attesting Officer*  Acting Commissioner of Patents and Trademarks